(12) United States Patent
Zhang et al.

(10) Patent No.: US 11,549,602 B2
(45) Date of Patent: Jan. 10, 2023

(54) LIQUID SEAL METHOD FOR ON-OFF OF GAS PIPELINE AND DEVICE THEREOF

(71) Applicants: TIANJIN UNIVERSITY, Tianjin (CN); GEORGIA TECH SHENZHEN INSTITUTE, TIANJIN UNIVERSITY, Shenzhen (CN)

(72) Inventors: Tengfei Zhang, Tianjin (CN); Tinglu Zhang, Tianjin (CN); Guanyi Chen, Tianjin (CN)

(73) Assignees: TIANJIN UNIVERSITY, Tianjin (CN); GEORGIA TECH SHENZHEN INSTITUTE, TIANJIN UNIVERSITY, Shenzhen (CN)

( * ) Notice: Subject to any disclaimer, the term of this patent is extended or adjusted under 35 U.S.C. 154(b) by 120 days.

(21) Appl. No.: 17/191,574

(22) Filed: Mar. 3, 2021

(65) Prior Publication Data

US 2022/0018457 A1  Jan. 20, 2022

(30) Foreign Application Priority Data

Jul. 15, 2020 (CN) .......................... 202010679796.3

(51) Int. Cl.
*F16K 13/10* (2006.01)
*F16K 31/50* (2006.01)

(52) U.S. Cl.
CPC .............. *F16K 13/10* (2013.01); *F16K 31/50* (2013.01)

(58) Field of Classification Search
CPC ........ F16K 13/10; F16K 31/50; F16K 31/508; E03C 1/284
See application file for complete search history.

(56) References Cited

U.S. PATENT DOCUMENTS

| 104,037 | A | * | 6/1870 | King | F16K 31/508 251/266 |
|---|---|---|---|---|---|
| 245,011 | A | * | 8/1881 | Nicholson | F16K 13/10 137/251.1 |
| 276,217 | A | * | 4/1883 | Blatchly | F16K 13/10 137/251.1 |
| 280,193 | A | * | 6/1883 | Lemmon | F16K 13/10 137/251.1 |
| 302,584 | A | * | 7/1884 | Pike | F16K 13/10 137/251.1 |
| 413,307 | A | * | 10/1889 | Rhett | E03F 5/042 137/247.23 |
| 546,766 | A | * | 9/1895 | Keith | E03C 1/284 137/247.13 |

(Continued)

*Primary Examiner* — Umashankar Venkatesan
(74) *Attorney, Agent, or Firm* — Dragon Sun Law Firm, PC; Jinggao Li; Nathaniel Perkins

(57) ABSTRACT

The present application discloses a liquid seal method for on-off of gas pipeline and a device thereof, wherein a liquid-sealed U-shaped container being provided in the gas pipeline that requires to perform on-off control; a lifting mechanism using a leading screw controls the slider having a certain volume to immerse in or leave the liquid so as to raise or lower the liquid level. The U-shaped container has a structure with a wide top and a narrow bottom, the space of the U-shaped container is divided into two spaces with different sizes by a separating plate, and a liftable liquid-occupying device is located at the space having a larger volume; the upper and lower parts of the slider are tapered; and the driving device can be motor or hand wheel.

5 Claims, 3 Drawing Sheets

(56) References Cited

U.S. PATENT DOCUMENTS

| | | | | |
|---|---|---|---|---|
| 1,884,855 | A | * | 10/1932 | Pryce ............... E03C 1/284 |
| | | | | 138/109 |
| 2,253,594 | A | * | 8/1941 | Tom-Wilson ......... F16K 13/10 |
| | | | | 137/506 |
| 2,329,997 | A | * | 9/1943 | Luff ................ E03C 1/284 |
| | | | | 137/247.43 |
| 4,092,747 | A | * | 6/1978 | Kessel .............. E03F 5/0405 |
| | | | | 4/286 |
| 6,629,621 | B1 | * | 10/2003 | Piotrowski .......... F16K 24/04 |
| | | | | 220/228 |
| 2004/0187925 | A1 | * | 9/2004 | Newman .............. F16K 3/28 |
| | | | | 137/247.13 |
| 2011/0036417 | A1 | * | 2/2011 | McAlpine ............ E03C 1/29 |
| | | | | 137/247.13 |

* cited by examiner

LIQUID SEAL METHOD FOR ON-OFF OF GAS PIPELINE AND DEVICE THEREOF

CROSS-REFERENCE TO RELATED APPLICATION

This Application claims priority from the Chinese patent application 2020106797963 filed Jun. 15, 2020, the content of which is incorporated herein in the entirety by reference.

TECHNICAL FIELD

The present invention relates to the field of gas pipeline control, and in particular to a liquid seal method for on-off of gas pipeline and device thereof.

BACKGROUND OF THE PRESENT INVENTION

Since buildings usually have intermittent ventilation requirements, the gas pipeline of the ventilation system is required to have the on-off function, so that the ventilation system can be quickly switched on when the gas pipeline is connected thereto, thus ensuring the ventilation. When the gas pipeline is switched off, the ventilation system should be as stable as possible, so that the gas can avoid leaking from one side to the other side. For example, kitchen and bathroom in the building produce unpleasant smell during use, so that the ventilation system is required to discharge unpleasant air into the public air shaft in time; when the exhaust is completed, if there is no such a non-return measure to block the gas pipeline, the gas in the air shaft may flow back into the indoor due to the fluctuation of the pressure in the public air shaft, which will affect indoor hygiene and the health of residents. Meanwhile, for other fields where there is intermittent ventilation requirement, there is also a need for rapid on-off control of gas pipelines.

In order to prevent the gas on both sides from connecting with each other when the gas pipeline is blocked, the existing patents and products for the on-off and non-return of gas pipelines usually adopt check plate and the like. When the air exhausting device is on, the check plate therein is lifted under the action of wind pressure, so that the air can pass through; when the air exhausting device is off, the check plate, which plays the role of blocking, will fall under the action of gravity or springs. The check plate has advantages such as simple structure and low cost, and has disadvantages that cannot be sealed tightly, so that the gas pipeline cannot be sealed completely, such as the check plate may be sucked up when negative pressure occurs in the air shaft, causing the unpleasant air into the room. In addition, the check plate may not be fully opened when the gas pipeline requires to be connected, thus limiting the flow capacity of the gas pipeline. Some patents additionally equipped with an electronic control device to interact the on/off of the check plate with the on/off of the exhaust fan and other devices, so that the check plate can be fully opened. This technique can reduce the exhaust resistance effectively, but it does not solve the problem that the check plate cannot be sealed completely.

The liquid seal can continuously and reliably block the connection of the gas on both sides without being affected by pressure. The liquid seal currently used in buildings is mainly the liquid seal in the drainage system, in which the liquid only needs to be kept sealed, but the liquid seal may not have a sealing effect due to water evaporation. Accordingly, the related patents to solve the problem of controlling the sealing liquid level mainly by adding a liquid level sensor to control the water supply pipe to ensure that the liquid seal is maintained at a certain height, and there is no need and function to control the rise and fall of the liquid seal liquid level. Liquid seals have certain on-off requirements when they are applied in the field of gas transportation. Some patents adopt a movable bell-shaped valve, by controlling it to leave or immerse in the sealing liquid in order to control the liquid level, so that the connection and blocking of the flow is realized. However, the outlet pipe of this method is required to be inclined, and the size of the outlet is limited by the height of the liquid level, which will cause greater resistance to the gas pipeline and bring inconvenience to the existing gas pipeline transformation.

SUMMARY OF THE PRESENT INVENTION

To overcome the deficiencies of the prior art, the present invention provides a liquid seal method for on-off of gas pipeline and device thereof, which solves the problems of poor on-off effect of the gas pipeline and a complex and impractical device structure in the prior art. For this purpose, the following technical solutions are employed in the present invention.

A liquid seal method for on-off of gas pipeline, wherein a liquid-sealed U-shaped container is provided in the gas pipeline that requires to perform on-off control; the U-shaped container comprises a separating plate arranged at the upper part, and the separating plate has a certain distance from the bottom of the container; when it is necessary to block the gas pipeline, an object is controlled to immerse into the liquid in the U-shaped container until the liquid level rises above the bottom of the separating plate, so that the gas pipeline on both sides of the U-shaped container are blocked; when it is necessary to unblock the gas pipeline, the object is controlled to leave from the liquid in the U-shaped container until the liquid level is lowered below the bottom of the separating plate, so that the gas pipeline on both sides of the U-shaped container are connected through.

Further, the object is selected from the following two modes, one is composed of a plurality of liquid-occupying components connected by flexible connections, each of the component occupies a certain volume, and the specific gravity of the component is greater than that of the liquid in the U-shaped container; the other is an integral object, which is a single object occupying a certain volume, and the specific gravity of the object is greater than that of the liquid in the U-shaped container.

A liquid seal device for on-off of gas pipeline, comprising an air inlet pipe, an air outlet pipe, two pipe joints, a U-shaped container, a separating plate and a liftable liquid-occupying device; wherein, the air inlet pipe and the air outlet pipe are connected to the sides of the U-shaped container via the pipe joints, respectively; the separating plate divides the U-shaped container into two spaces with different sizes, the upper end of the separating plate is attached to the U-shaped container, the bottom of the separating plate has a certain distance from the bottom of the container; the liftable liquid-occupying device is provided in the side with large space in the U-shaped container, including a leading screw, a positioning rod, a slider, a bearing seat and a driving device; the leading screw penetrates the slider and is capable of rotating to control the lifting of the slide; the positioning rod is parallel to the leading screw and penetrates one side of the slider, so that the slide can keep balance when lifting; the driving device, used for providing rotating power of the leading screw, is connected to the leading screw and is located at the top thereof.

Further, the U-shaped container has a structure with a wide top and a narrow bottom, and the side wall where the liftable liquid-occupying device is located is wedge-shaped, which ensures that the liquid level can be changed quickly when the slider leaves or is immersed in the liquid in the U-shaped container. The space with the wedge-shaped side wall has a larger volume, so it is convenient to adopt the liquid-occupying device having a large volume to increase the height of the liquid level when occupying the liquid, so that the amount of liquid can be reduced; meanwhile, such structure ensures that the slide does not occupy too much flow channel after being lifted; the entire side walls or partial side walls of the U-shaped container is made of transparent material, which is convenient for observing the liquid level or the internal situation of the container.

Further, the liquid in the U-shaped container is odorless, non-toxic, and non-volatile, so that the liquid volume is relatively fixed and the formed liquid seal is relatively stable.

Further, the slider moves vertically along the leading screw and the positioning rod, and its upper and lower parts are tapered to minimize the resistance when the slider leaves or is immersed in the liquid; the slider is a hollow structure, and the leading screw and positioning rod do not pass through the hollow cavity, which saves manufacturing materials on the premise that the volume of the slider meets the requirements.

Further, the driving device is connected to the top of the leading screw, and the driving device is selected from the following modes, one is driven by a motor to provide power to rotate the leading screw, the motor is located inside or outside the U-shaped container, and the motor is connected to the top of the leading screw and placed on a support; the other is hand wheel drive, the operator turns the hand wheel to provide power for the leading screw to rotate; the hand wheel is connected to the top of the leading screw on the outside of the U-shaped container.

Further, the control of the rotation of the leading screw by the motor can be linked with the on or off of the fan in the air pipeline. When the fan is switched on, the motor controls the leading screw to rotate so as to raise the slider, and stops rotating when the slide rises to the highest position; when the fan is switched off, the motor controls the leading screw to rotate in reverse direction to lower the slider, and stops rotating after the slide is completely immersed in the liquid and a stable liquid seal is formed.

The beneficial effects of the present invention are as follows:

1. The present invention adopts a liquid-sealed U-shaped container to achieve the on-off control of gas pipeline, and the liquid level therein is raised or lowered by immersing an object in the liquid or leaving it out of the liquid so as to achieve the closing or opening of the liquid seal. Compared to the existing check plate used in the gas pipeline, the device of the present invention can achieve completely blocking of the gas pipeline when it is required, and can effectively avoid the connection between the two sides of the gas pipeline due to pressure fluctuations and other reasons; and when the gas pipeline needs to be connected through, the device will not block the flow of the gas pipeline.

2. The device of the present invention applies the slider mechanism using the leading screw guiding to realize the accurately control of the position of the slider, and the frictional resistance of the slider movement is small; and the upper and lower parts of the slider are tapered, which has small resistance when the slider leaves or is immersed in the liquid The above two designs can reduce the energy consumption required by the driving device.

3. The U-shaped container of the device has a structure with a wide top and a narrow bottom, which ensures that the liquid level can be decreased quickly when the slider leaves from the liquid, so as to connect both sides of the U-Shaped container; and the space where the liftable liquid-occupying device is located has a large volume in the U-shaped container, such structure ensures that the slide does not occupy too much flow channel after being lifted; the above-mentioned design reduces the gas flow resistance and reduce the energy consumption of gas transportation.

4. The device is simple in principle and structure, simple in operation and maintenance, easy to modify the existing gas pipeline, and suitable for promotion and use in industries that require intermittent ventilation or ventilation control.

5. The present invention can realize the on-off of the gas pipeline in the U-shaped container according to the requirements, the method has strong practicability, the device structure is simple and reliable, having small obstruction to the air flow channel, and is convenient to control.

In which:

| | |
|---|---|
| 1: air inlet pipe | 2: pipe joint |
| 3: U-shaped container | 4: separating plate |
| 5: leading screw | 6: positioning rod |
| 7: slide | 8: bearing seat |
| 9: motor | 10: support |
| 11: air outlet pipe | 12: hand wheel |

DETAILED DESCRIPTION OF THE PRESENT INVENTION

The present invention will be further described below in detail in combination with the specific embodiments and drawings. The described specific embodiments are only used for describing the present invention, are not intended to limit the present invention.

Figure 1A:
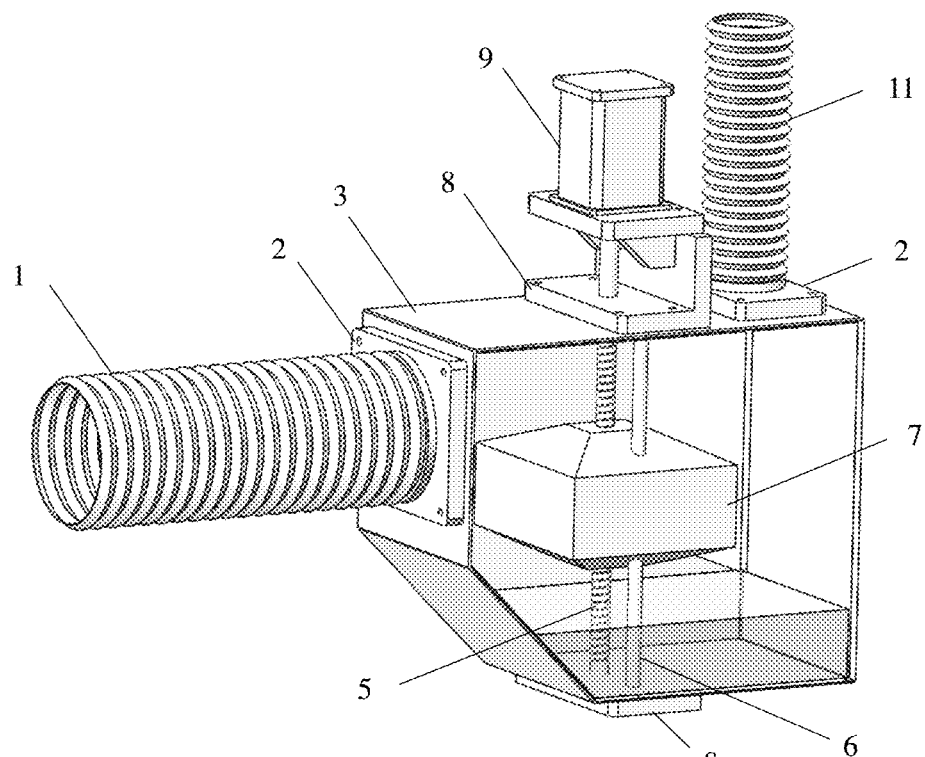
FIG. 1a is a schematic diagram of the whole device.
Figure 1B:
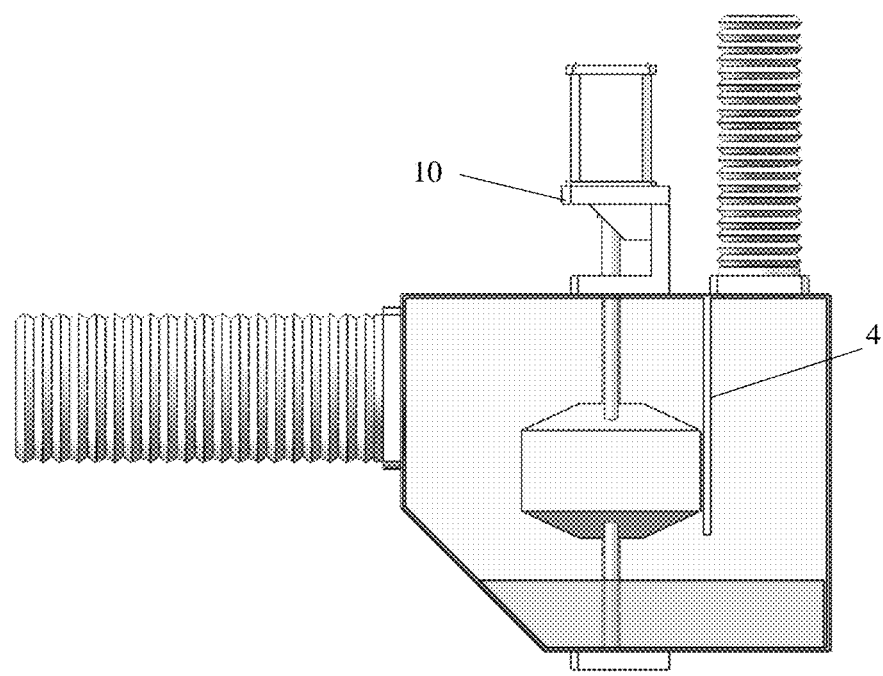
FIG. 1b is a schematic diagram of the side view of the device.

FIG. 1 shows the liquid seal device for on-off of gas pipeline according to the present invention, which power mechanism is motor and the motor is provided outside the U-shaped container. The liquid seal device comprises an air inlet pipe 1, two pipe joints 2, a U-shaped container 3, a separating plate 4, a leading screw 5, a positioning rod 6, a slider 7, a bearing seat 8, a motor 9, a support 10 and an air outlet pipe 11. Wherein, the separating plate 4 divided the U-shaped container 3 into two spaces with different sizes, and the leading screw 5 and the positioning rod 6 vertically penetrated the space of the U-shaped container 3 where the air inlet pipe located. The motor 9, which is arranged on the support 10, controlled the leading screw 5 to rotate, thereby driving the slider 7 to move up and down, and the positioning rod 6 penetrated one side of the slider 7 to maintain its balance during movement.

Figure 2:
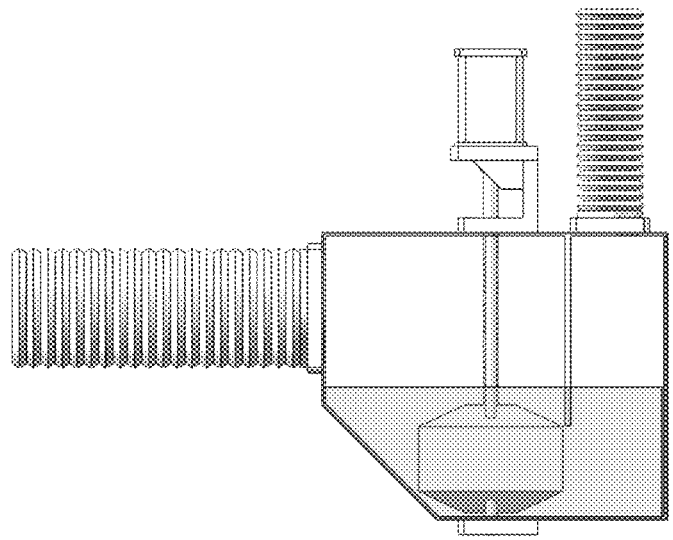
FIG. 2 is a schematic diagram of a blocked state of the liquid seal device according to the present invention, in which the slider is immersed in the liquid.

FIG. 2 is a schematic diagram of a blocked state of the liquid seal device according to the present invention, in which the slider is immersed in the liquid. When the gas pipeline needs to be kept blocked, the slide 7 kept at a lower position in the U-shaped container 3, that is, the slider 7 was completely immersed in the liquid. Since the slider 7 was occupied a certain volume, the liquid level of the U-shaped container 3 was maintained at a height higher than the bottom of the separating plate 4 to form a liquid seal so as to isolate the gas between the air inlet pipe and air outlet pipe.

Figures 3A, 3B:
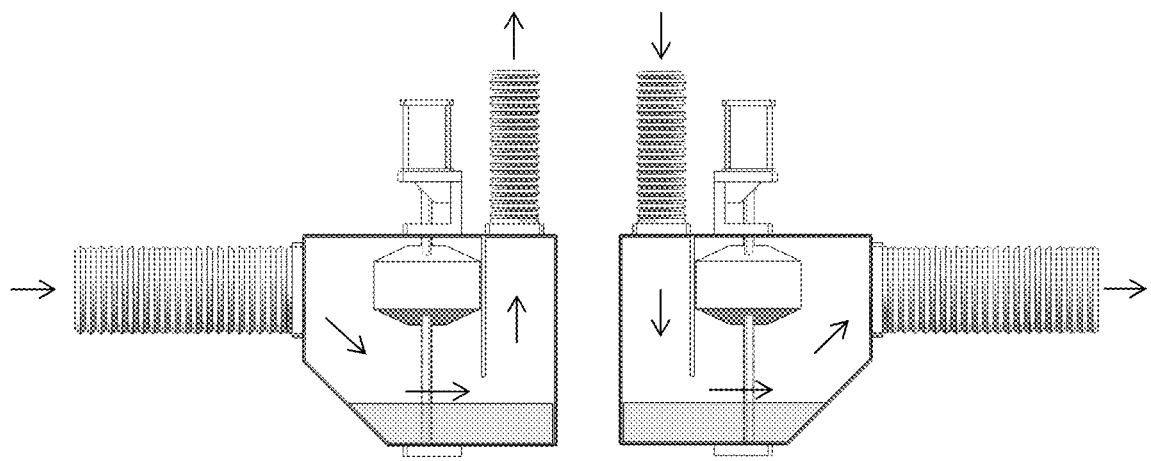
FIG. 3a shows a schematic diagram of the liftable liquid-occupying device located at the side of the air inlet pipe.
FIG. 3b shows a schematic diagram of the liftable liquid-occupying device located at the side of the air outlet pipe.

FIG. 3 is a schematic diagram of a connecting-through state of the liquid seal device according to the present invention; in which, FIG. 3(a) shows the liftable liquid-occupying device is located at the side of the air inlet pipe; FIG. 3(b) shows the liftable liquid-occupying device is located at the side of the air outlet pipe. When the gas pipeline needs to be connected through, the fan was switched on, the motor 9 linked with the fan controlled the leading screw 5 to rotate so as to raise the slider 7, and was stopped rotating when the slide 7 rose to the highest position of the U-shaped container 3. Due to the slider 7 no longer occupies the volume in the liquid when it left from the liquid, the liquid level of the liquid drops below the bottom of the separating plate 4, so that the air inlet side and air outlet side of the U-shaped container 3 are connected through.

Figure 4:
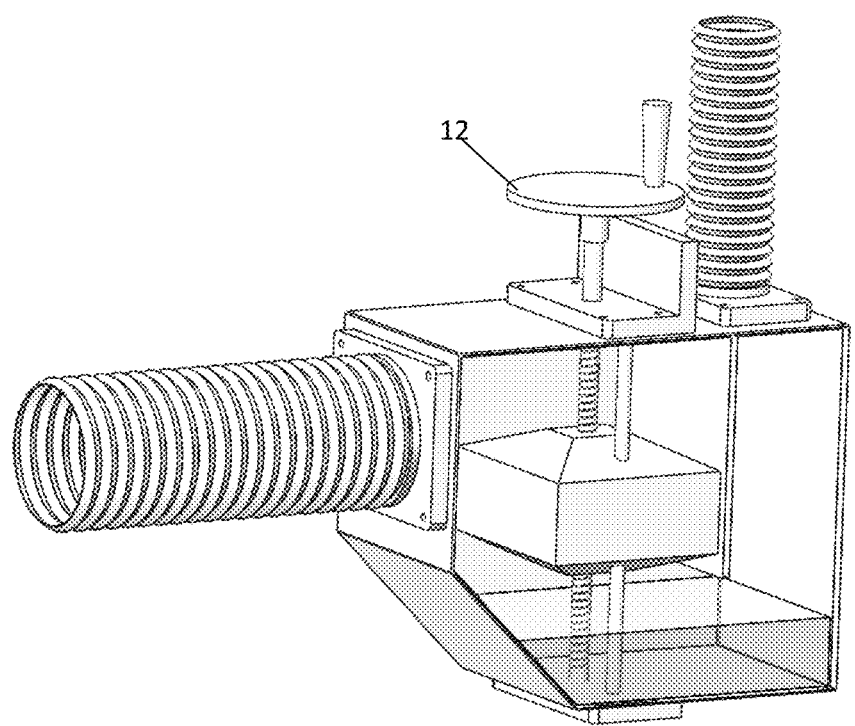
FIG. 4 is a schematic diagram of the liquid seal device according to the present invention with a hand wheel as a driving device.

FIG. 4 is a schematic diagram of the liquid seal device according to the present invention with a hand wheel as a driving device. The motor 9 and its support 10 were replaced with the hand wheel 12. The operator can turn the hand wheel 12 to provide power for the leading screw 5 to rotate so as to move the slider 7 vertically, thus achieve the blocking or connection of the gas pipeline.

Although the application has been described above, the application is not limited to the above specific embodiments, which are only illustrative rather than restrictive. Those skilled in the art may make many variations without departing from the purpose of the application under the inspiration of the application, which are all within the scope of protection of the application.

What is claimed is:

1. A liquid seal device for on-off of gas pipeline, comprising an air inlet pipe, an air outlet pipe, two pipe joints, a U-shaped container, a separating plate and a liftable liquid-occupying device; wherein, the air inlet pipe and the air outlet pipe are connected to the sides of the U-shaped container via the pipe joints, respectively; the separating plate divides the U-shaped container into two spaces with different sizes, the upper end of the separating plate is attached to the U-shaped container, the bottom of the separating plate has a certain distance from the bottom of the container; the liftable liquid-occupying device is provided in the space having a large space in the U-shaped container, including a leading screw, a positioning rod, a slider, a bearing seat and a driving device; the leading screw penetrates the slider and is capable of rotating to control the lifting of the slide; a positioning rod is parallel to the leading screw and penetrates one side of the slider, so that the slide can keep balance when lifting; the driving device, used for providing rotating power of the leading screw, is connected to the leading screw and is located at the top thereof;

wherein the liquid in the U-shaped container is odorless, non-toxic, and non-volatile, so that the liquid volume is relatively fixed.

2. The liquid seal device according to claim 1, wherein the driving device is connected to the top of the leading screw, and the driving device is selected from the following modes, one is driven by a motor to provide power to rotate the leading screw, the motor is located inside or outside the U-shaped container, and the motor is connected to the top of the leading screw and placed on a support; the other is hand wheel drive, the operator turns the hand wheel to provide power for the leading screw to rotate; the hand wheel is connected to the top of the leading screw on the outside of the U-shaped container.

3. The liquid seal device according to claim 2, wherein the control of the rotation of the leading screw by the motor can be linked with the on or off of a fan in the air pipeline; when the fan is switched on, the motor controls the leading screw to rotate so as to raise the slider, and stops rotating when the slide rises to the highest position; when the fan is switched off, the motor controls the leading screw to rotate in reverse direction to lower the slider, and stops rotating after the slide is completely immersed in the liquid and thus blocks pipeline flow, thereby forming a stable liquid seal.

4. A liquid seal device for on-off of gas pipeline, comprising an air inlet pipe, an air outlet pipe, two pipe joints, a U-shaped container, a separating plate and a liftable liquid-occupying device; wherein, the air inlet pipe and the air outlet pipe are connected to the sides of the U-shaped container via the pipe joints, respectively; the separating plate divides the U-shaped container into two spaces with different sizes, the upper end of the separating plate is attached to the U-shaped container, the bottom of the separating plate has a certain distance from the bottom of the container; the liftable liquid-occupying device is provided in the space having a large space in the U-shaped container, including a leading screw, a positioning rod, a slider, a bearing seat and a driving device; the leading screw penetrates the slider and is capable of rotating to control the lifting of the slide; a positioning rod is parallel to the leading screw and penetrates one side of the slider, so that the slide can keep balance when lifting; the driving device, used for providing rotating power of the leading screw, is connected to the leading screw and is located at the top thereof;

wherein the U-shaped container has a structure with a wide top and a narrow bottom, and the side wall where the liftable liquid-occupying device is located is wedge-shaped, the space with the wedge-shaped side wall has a larger volume; the entire side walls or partial side walls of the U-shaped container is made of transparent material, which is convenient for observing the liquid level or the internal situation of the container.

5. A liquid seal device for on-off of gas pipeline, comprising an air inlet pipe, an air outlet pipe, two pipe joints, a U-shaped container, a separating plate and a liftable liquid-occupying device; wherein, the air inlet pipe and the air outlet pipe are connected to the sides of the U-shaped container via the pipe joints, respectively; the separating plate divides the U-shaped container into two spaces with different sizes, the upper end of the separating plate is attached to the U-shaped container, the bottom of the separating plate has a certain distance from the bottom of the container; the liftable liquid-occupying device is provided in the space having a large space in the U-shaped container, including a leading screw, a positioning rod, a slider, a bearing seat and a driving device; the leading screw penetrates the slider and is capable of rotating to control the lifting of the slide; a positioning rod is parallel to the leading screw and penetrates one side of the slider, so that the slide can keep balance when lifting; the driving device, used for providing rotating power of the leading screw, is connected to the leading screw and is located at the top thereof;

wherein the slider moves vertically along the leading screw and the positioning rod, and its upper and lower parts are tapered; the slider is a hollow structure, and the leading screw and positioning rod do not pass through the hollow cavity.

* * * * *